US006997643B2

(12) United States Patent
Wille et al.

(10) Patent No.: US 6,997,643 B2
(45) Date of Patent: Feb. 14, 2006

(54) LNG TANKER OFFLOADING IN SHALLOW WATER

(75) Inventors: Hein Wille, Eze (FR); Jack Pollack, Houston, TX (US)

(73) Assignee: Sbm-Imodco Inc., Houston, TX (US)

( * ) Notice: Subject to any disclaimer, the term of this patent is extended or adjusted under 35 U.S.C. 154(b) by 0 days.

(21) Appl. No.: 10/962,955

(22) Filed: Oct. 12, 2004

(65) Prior Publication Data

US 2005/0095068 A1 May 5, 2005

Related U.S. Application Data

(60) Provisional application No. 60/559,989, filed on Apr. 5, 2004, provisional application No. 60/550,133, filed on Mar. 4, 2004, provisional application No. 60/515,767, filed on Oct. 30, 2003.

(51) Int. Cl.
*B63B 21/00* (2006.01)
*B63B 22/02* (2006.01)
*B65G 5/00* (2006.01)

(52) U.S. Cl. .......................... 405/53; 405/59; 405/169; 405/203; 405/204; 114/230.1; 441/4; 441/5; 166/357

(58) Field of Classification Search .................. 405/53, 405/59, 169, 203–207, 210, 224; 114/230.1, 114/293, 294; 441/3–5; 166/269, 357
See application file for complete search history.

(56) References Cited

U.S. PATENT DOCUMENTS 3,541,622 A * 11/1970 Harlow .......................... 441/5
4,317,474 A * 3/1982 Kentosh ........................ 141/1
4,516,942 A * 5/1985 Pedersen ....................... 441/5
4,567,843 A * 2/1986 d'Hautefeuille ........ 114/230.14
4,665,856 A * 5/1987 Pedersen ............... 114/230.14
5,511,905 A * 4/1996 Bishop et al. ................ 405/59
5,878,814 A * 3/1999 Breivik et al. .............. 166/267
6,003,603 A * 12/1999 Breivik et al. .............. 166/357
6,230,809 B1 * 5/2001 Korsgaard .................. 166/357
6,244,920 B1 * 6/2001 de Baan ........................ 441/3
6,517,286 B1 * 2/2003 Latchem ...................... 405/53
6,739,140 B1 * 5/2004 Bishop et al. ............... 62/53.1
2005/0106959 A1 * 5/2005 Storvoll et al. ................ 441/5

FOREIGN PATENT DOCUMENTS

EP 597595 * 5/1994

* cited by examiner

*Primary Examiner*—Jong-Suk (James) Lee
(74) *Attorney, Agent, or Firm*—Leon D. Rosen

(57) ABSTRACT

A system for offloading LNG (liquified natural gas) from a tanker (26) in shallow waters, for regasing, or heating the offloaded LNG to produce gaseous hydrocarbons, or gas, for pressurizing the gas, and for flowing the gas to an onshore station (56), includes a structure that is fixed to the sea floor and projects above the sea surface and aids in mooring the tanker. In one system, the structure that is fixed to the sea floor is a largely cylindrical tower (12) with a mooring yoke (20) rotatably mounted on its upper end. A floating structure (14) such as a barge that weathervanes, has a bow end pivotally connected to a distal end of the yoke, so the barge is held close to the tower but can drift around the tower with changing winds, waves and currents. The tanker is moored to the barge so the barge and tanker form a combination that weathervanes as a combination. Regas and pressurizing equipment (32, 34) for heating and pressuring the LNG, and any crew quarters (36), are all located on the barge, so a low cost tower can be used. In another system, the structure is a breakwater (180).

5 Claims, 5 Drawing Sheets

FIG. 9
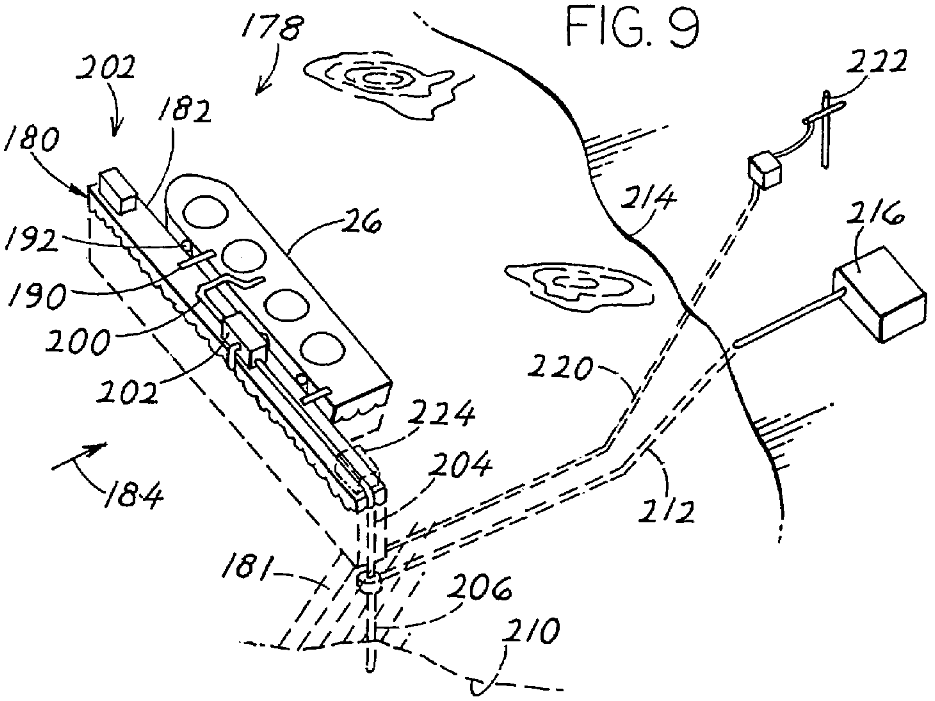
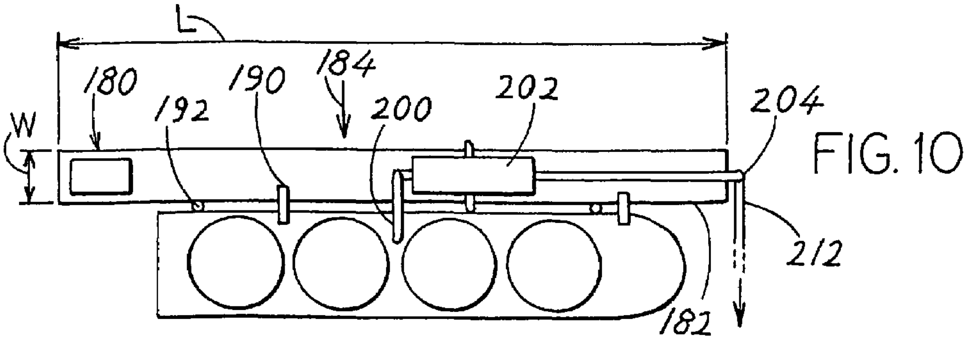
FIG. 10
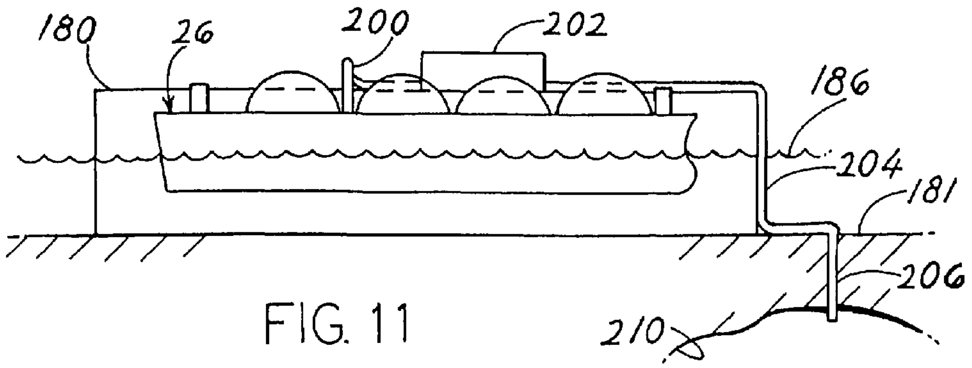
FIG. 11

LNG TANKER OFFLOADING IN SHALLOW WATER

CROSS-REFERENCE

Applicant claims priority from U.S. provisional applications Ser. No. 60/515,767 filed Oct. 30, 2003, Ser. No. 60/550,133 filed Mar. 4, 2004, and Ser. No. 60/559,989 filed Apr. 5, 2004.

BACKGROUND OF THE INVENTION

Hydrocarbons that are gaseous at room temperature such as 20° C., are often transported by tanker as LNG (liquified natural gas) at −160° C. and atmospheric pressure. Other cold forms during transport are hydrates (gas entrapped in ice) and cooled CNG (compressed natural gas that has been cooled well below 0° C. to reduce the pressure required to keep it liquid). At the tanker's destination, the LNG (or other cold gas) may be offloaded, heated and pressurized, and carried by pipeline to an onshore station for distribution (or possibly for use as by a power plant at the onshore station).

Proposed prior art offloading and regas/injection systems (for heating and pressuring LNG) include a fixed platform extending up from the sea floor to a height above the sea surface and containing facilities that heat and pump the cold hydrocarbons and containing crew facilities (beds, toilet, food storage, etc.). The heating is sufficient to transform LNG into gas that is warm enough (usually at least 0° C.) to avoid ice formations around noncryogenic hoses and pipes that carry the gas. The platform also carries a pump system that pumps the gas to a high enough pressure to pump it along a sea floor pipeline to an onshore station, and/or to a cavern and maintain a high pressure in the cavern so gas can flow therefrom to an onshore station. A platform that is large enough to carry such gas heating and pumping systems can be expensive even in shallow waters.

It is possible to greatly lower costs by the use of a floating weathervaning structure such as a barge with a turret near the bow, that is moored by catenary chains to the sea floor, to carry the regas and pressurizing equipment and crew quarters, and to moor the tanker. However, in shallow depths (e.g. less than about 70 meters), drifting of the vessel tends to lift the entire length of chain off the sea floor. This can result in a sudden increase in chain tension rather that a gradual increase that is required. A system of minimum cost, for mooring a tanker, offloading LNG from the tanker, heating and pressuring the LNG, accommodating any crew, and flowing the gaseous hydrocarbons to an onshore station, in a sea location of shallow depth, would be of value.

SUMMARY OF THE INVENTION

In accordance with one embodiment of the invention, applicant provides a system for use in shallow depths such as no more than 70 meters, for mooring a tanker carrying cold hydrocarbons (well below 0° C., and usually LNG), regasing the hydrocarbons (heating cold hydrocarbons, usually to above 0° C., as to gasify LNG), pressurizing the now-gaseous hydrocarbons, holding a crew that operates and maintains the equipment, and carrying the gaseous hydrocarbons to an onshore installation, all in a system of minimum cost. In one system, applicant provides a floating structure such as a barge, and a simple tower whose only major function is to permanently moor the barge while allowing it to weathervane. The tanker is attached to the barge so they weathervane together. The barge may be attached to the tower by a yoke that can pivot about a vertical axis on the tower to allow the barge to weathervane, and the tower carries a fluid swivel to pass fluids while the barge weathervanes. A regas unit, a pressurizing unit and crew quarters, are all located on the barge, and not on the tower.

In another system, a fixed structure in the form of a breakwater, provides a shallow sea location at which the tanker can be moored, while the tanker is protected from prevailing winds and waves. Regas and pressurizing units as well as crew quarters lie on the breakwater. The breakwater has a length at least 60%, and preferably at least 100%, of the tanker length, has a width no more that one-fourth as much as its length and extends a plurality of meters above the sea surface.

The regas and pressurizing units can be electrically energized, and electric power is carried between an onshore electric power station and the structure on which the regas and pressurizing units lie.

The novel features of the invention are set forth with particularity in the appended claims. The invention will be best understood from the following description when read in conjunction with the accompanying drawings.

BRIEF DESCRIPTION OF THE DRAWINGS

FIG. 9 is an isometric view of a system of another embodiment of the invention where a breakwater structure fixed to the sea floor at a shallow location, is long and narrow and to which the tanker is directly moored.

FIG. 10 is a plan view of the system of a portion of the system of FIG. 9.

FIG. 11 is a side elevation view of a portion of the system of FIG. 9.

DESCRIPTION OF THE PREFERRED EMBODIMENTS

Figure 1:
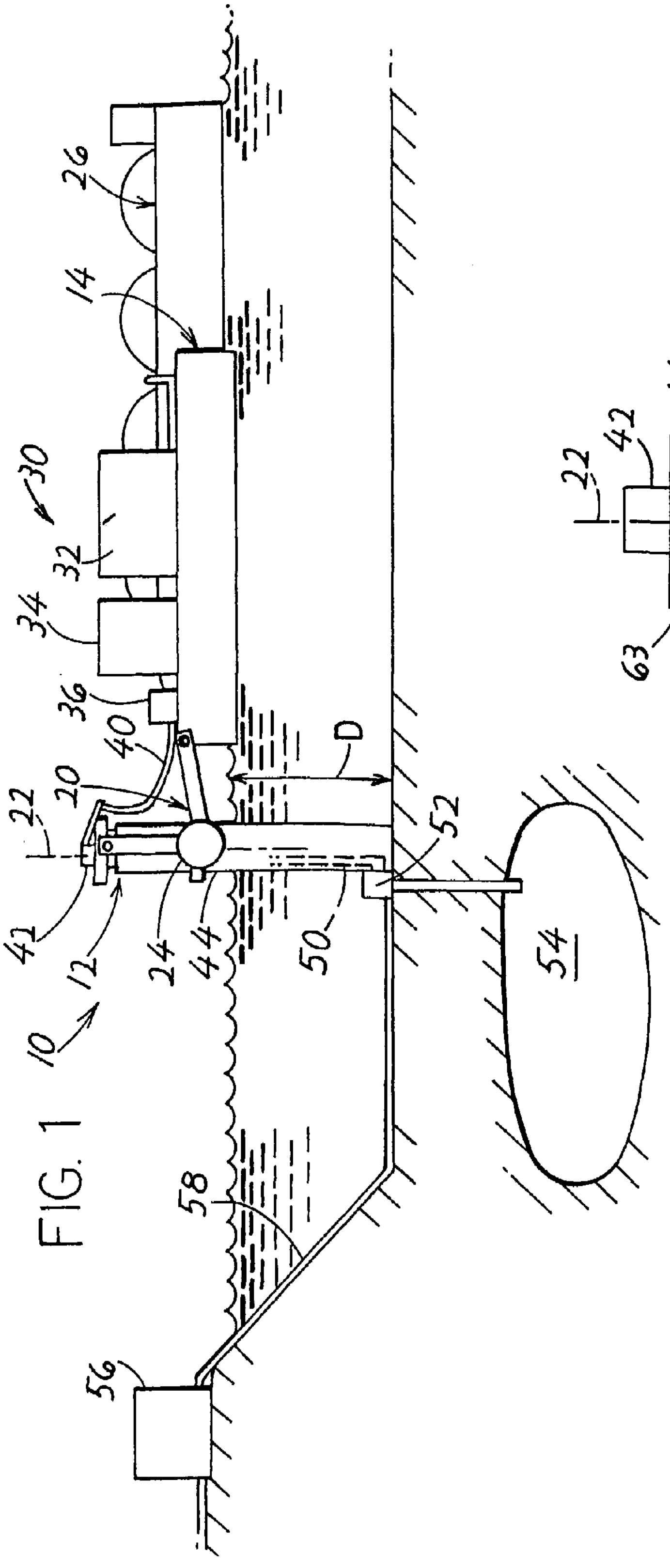
FIG. 1 is a side elevation view of a shallow water system for mooring a tanker carrying LNG, processing the LNG and delivering it to an onshore station.

FIG. 1 illustrates an offloading/injection system 10 for shallow water, in which a moderate cost fixed tower 12 is used in conjunction with a floating and weathervaning structure in the form of a barge 14. A yoke 20 which can rotate around the tower axis 22, allows the floating and weathervaning barge to drift a limited distance away from the tower and urges the barge back towards the tower, as with counterweights 24. Thus, the barge can weathervane, to head in different directions with changes in winds, waves and currents and can move slightly away and back towards the tower to minimize the forces resulting from large waves. A tanker 26 is moored directly to the barge and weathervanes with it.

The tanker carries cold hydrocarbons that are cooled well below 0° C., and which must be heated to at least 0° C. before they can be pressurized and flowed though a pipeline to shore. The most common type of such cold hydrocarbons is LNG (liquified natural gas) which has been cooled to −160° C. so it is liquid at atmospheric pressure. Another type is hydrates wherein gas is trapped in ice, and still another type is CNG (compressed natural gas) that is both cooled and pressurized. Before such cooled hydrocarbons can be passed though ordinary (noncryogenic) pipes, they must be heated to at least 0° C. to prevent ice formations about the pipes.

FIG. 1 shows processing equipment 30 that includes a regas unit 32 which heats LNG to turn it into a gas and to heat the gas to at least 0°C., and an injection(pressurizing) unit 34, that is mounted on the barge 14. Crew quarters 36 are usually provided, and are also mounted on the barge. A gas-carrying hose 40 extends from the barge to a fluid swivel 42 on the tower. A nonrotatable part of the fluid swivel is fixed to the main part 44 of the tower. The main part of the tower is largely cylindrical, in that it has perpendicular horizontal dimensions that are about the same in that neither one is more than about twice the other, to avoid interference with the weathervaning barge and avoid having to use an extra long yoke. A pipe 50 extends down from the fluid swivel to a seafloor platform 52. The platform connects to a cavern 54 and through a sea floor pipeline 58 to an onshore facility 56. A cavern can lie in the ground under the sea, or in ground not covered by the sea. The cavern has a capacity to store at least 0.5 billion standard cubic feet of gas.

By mounting the regas and injection units 32, 34 and crew quarters 36 on the barge 14 rather than on the mooring tower 12, applicant greatly reduces the cost of the tower while only moderately increasing the cost of the barge. The fact that the regas unit lies on the barge, which is moored to the tanker, allows LNG on the tanker to be offloaded in less time and with less expensive equipment (especially cryogenic hoses), than if the LNG had to pass from the tanker to the barge and then to a regas unit on the tower before being regassed. The fact that the yoke absorbs sudden large mooring forces as when a large wave impacts the barge and tanker, by allowing the barge and tanker to move away from the tower and to then pull them back, avoids the use of a massive and expensive tower. The tower is devoid of machinery (other than the fluid swivel) and operates without an onboard crew or crew quarters.

Figure 2:
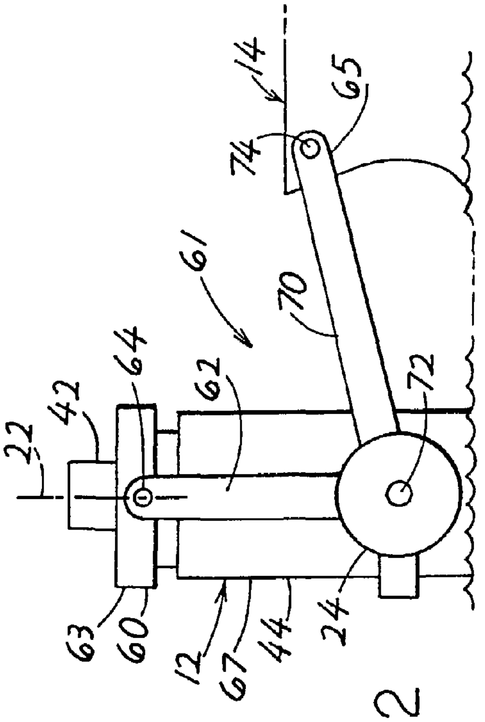
FIG. 2 is a side elevation view of a portion of the system of FIG. 1.

FIG. 2 shows that the yoke has a top bearing part 60 that can rotate about the vertical axis 22. Proximal and distal ends 63, 65 of the yoke are connected respectively to the tower upper end 67 and to the barge 14. The yoke includes a linkage 61 comprising a pair of largely vertical proximal beams 62 on opposite sides of the yoke, with upper ends pivotally connected about a horizontal axis 64 to the top bearing part and with lower ends carrying the counterweights 24. The linkage also includes a pair of distal beams 70 pivotally connected about a horizontal axis 72 to the lower ends of the proximal beams and having distal ends pivotally connected about a horizontal axis 74 to the barge.

Figure 3:
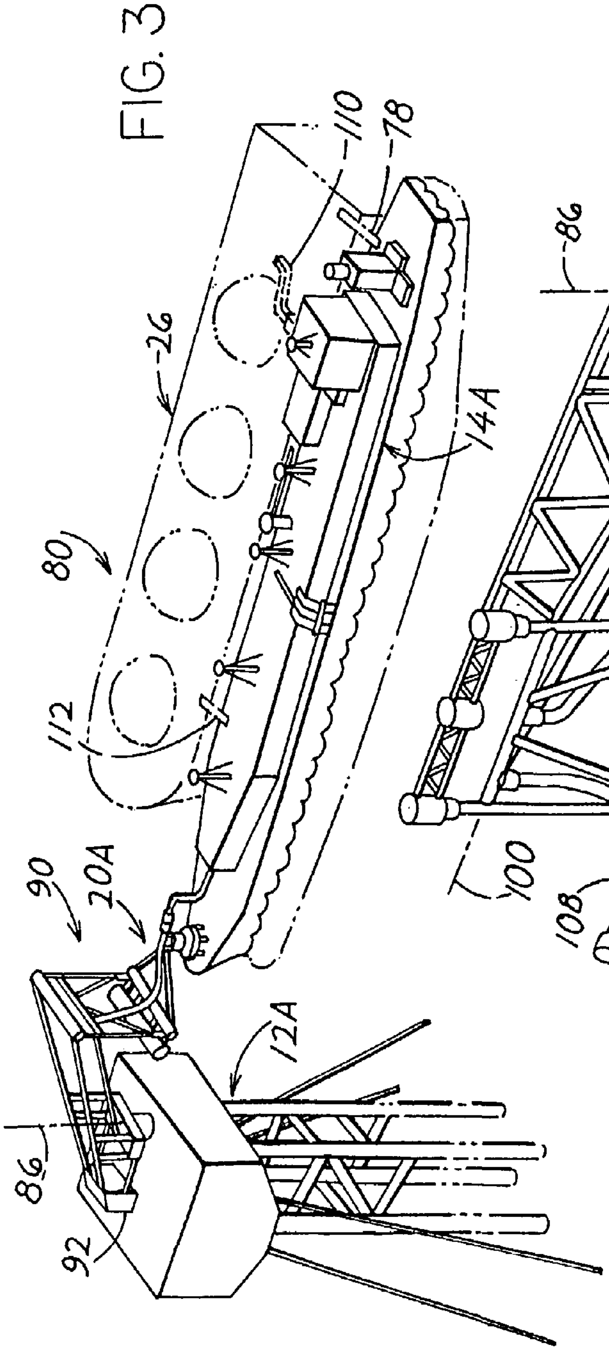
FIG. 3 is a left side and rear isometric view of a modified system of the type shown in FIG. 1, with the yoke connected to the floating structure
Figure 4:
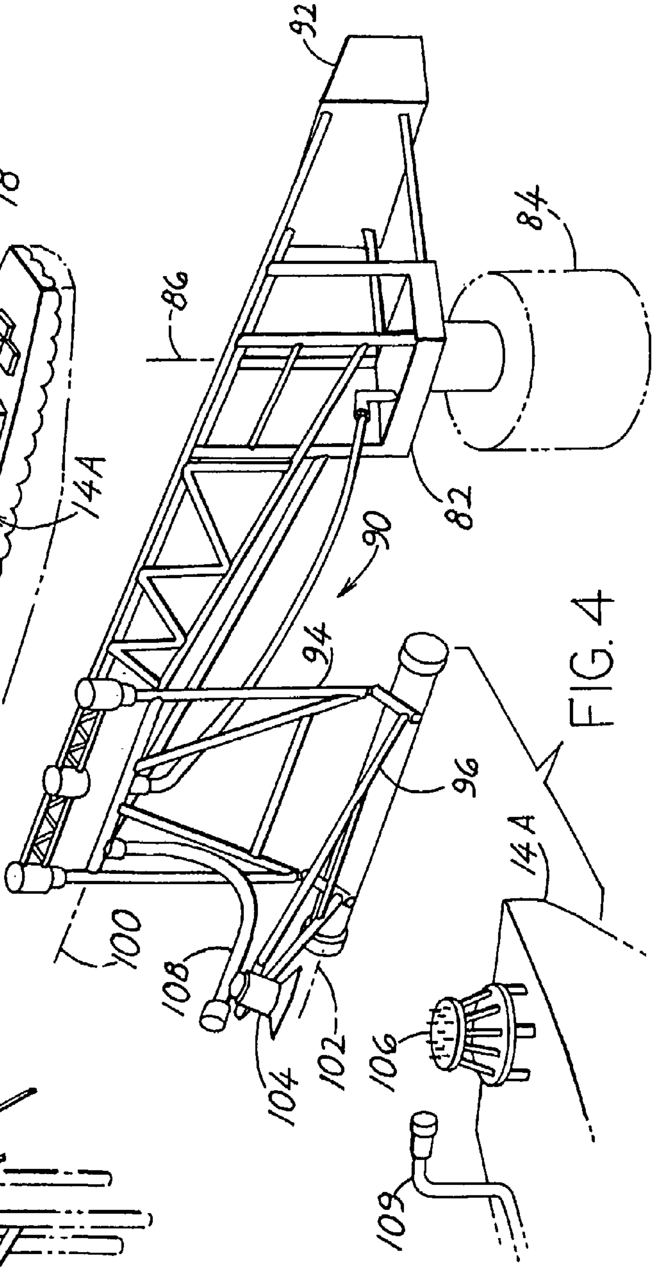
FIG. 4 is a left side and front isometric view of the system of FIG. 3, with the yoke approaching the floating structure but not yet connected to it.

FIGS. 3 and 4 show another system 80, and shows some details of a yoke 20A, the top of the tower 12A, and the floating structure 14A. FIG. 4 shows that the yoke includes a yoke base 82 that is mounted on a bearing assembly 84 that allows the base to rotate about a vertical axis 86. A beam structure linkage 90 with a counterweight 92, carries a pair of arms 94, 96 that pivot about axes 100,102. A structural connection head 104 with a uni-joint lies at the end of the arm 96 connects to a coupling 106 on the floating structure 14A. Hoses 108,109 connect to transfer gaseous hydrocarbons. FIG. 3 shows a short cryogenic hose or pipe arrangement 110 that carries LNG from the tanker 26 to the barge, and mooring lines 112 that connect the tanker to the barge. Applicant notes that cryogenic conduits that can carry LNG are expensive, and minimizing the amount of such conduits on the barge minimizes the cost of the system.

The mooring towers 12 and 12A of FIGS. 1–4 are useful in shallow waters in a moderately calm sea having a depth D (FIG. 1) of up to about 50 meters, and are useful in more turbulent waters having a depth of up to about 70 meters. As mentioned above, a floating structure moored by catenary chains to the sea floor is effective in deeper waters, where its catenary chains are more effective while applicant's systems are especially effective in shallow waters. If a storm is approaching the systems of FIGS. 1–4, which could produce waves that exceed the system mooring capacity, any tanker is unmoored from the barge. The barge can be disconnected from the yoke and towed away in hurricane situations.

Figure 5:
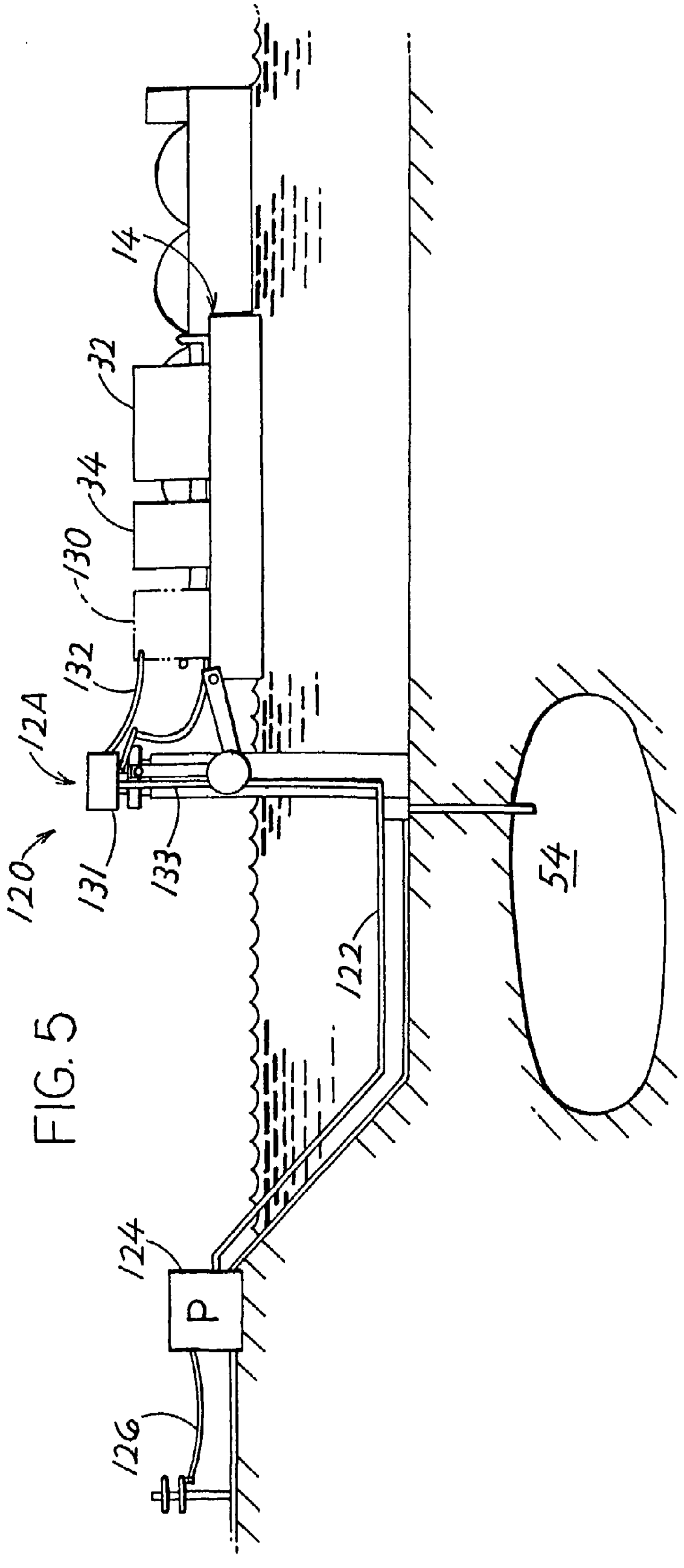
FIG. 5 is a side elevation view of a system similar to that of FIG. 1, but with an electric power transfer portion.

FIG. 5 illustrates a system 120 that is similar to that of FIG. 1, but with an electrical power cable, or power line 122 that carries electrical power between an onshore power and gas facility 124 and the barge floating structure 14. The regas and pressurizing units 32,34 are electrically powered. In FIG. 5, electric current and power can flow only from the onshore facility, which includes an onshore power line 126, and the barge 14. However, it is possible to build a power plant 130 on the floating structure 14, which uses hydrocarbons as fuel to produce all electricity required on the floating structure.

A tanker is moored to the barge and LNG on the tanker is unloaded, perhaps once in every five days. It may take one day to offload the tanker, during which time some of the LNG is stored in LNG tanks on the barge, while some of the LNG is regassed, pressurized and flowed to the onshore station and/or cavern 54. It may take an additional day to regas and pressurize the LNG stored in the tanks on the barge. During the other three days before the tanker arrives again, the power plant on the barge can continue to be operated to produce electricity, and that electricity is delivered to the shore-based facility 124. Such power, delivered for perhaps three days out of every five, supplements electrical power produced by onshore power plants. In FIG. 5, the swivel 131 at the top of the tower 12A receives current over line 132 and carries current to a power line 132 extending along the height of the tower and a power line 122 that extends along the sea floor to the onshore facility 124.

Figure 6:
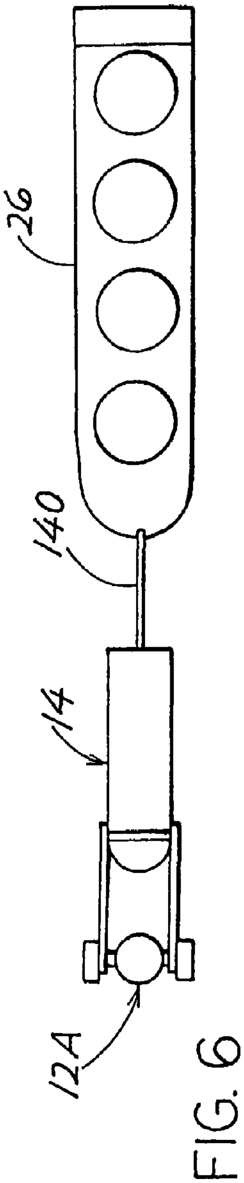
FIG. 6 is a plan view of a system similar to that of FIG. 5, but with the floating structure and tanker connected in tandem to weathervane together.

FIG. 6 shows that the tanker 26 can be moored to the barge 14 to weathervane with it, by a hawser 140 that extends from the stern of the barge to the bow of the tanker.

Figure 7:
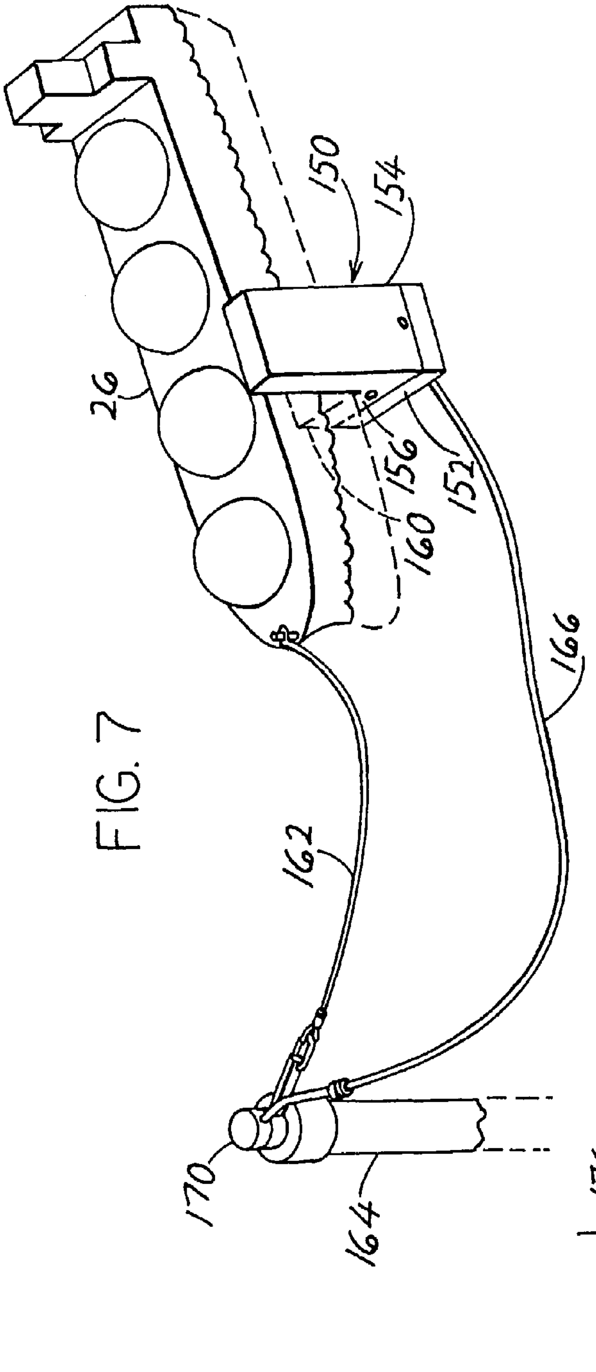
FIG. 7 is an isometric view of a system of another embodiment of the invention, where the floating structure is of the direct attachment type that fixes itself to the tanker and with the tanker moored though a small yoke and hawser to the tower.
Figure 8:
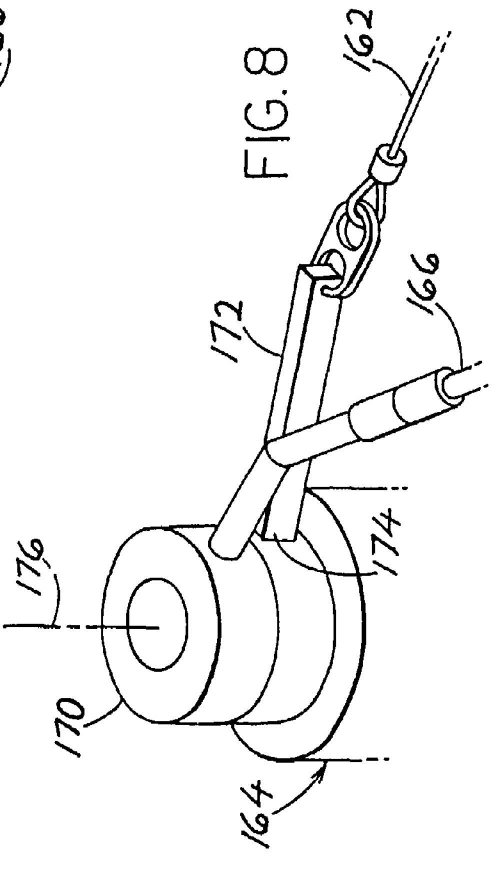
FIG. 8 is an isometric view of a portion of the system of FIG. 7, showing the top of the tower and the yoke thereof.

FIG. 7 shows a floating structure in the form of a direct attachment structure 150 that has a buoyancy-adjusting part 152 and a propulsion part 154. The direct attachment floating structure can lie low in the water and slowly propel itself until its under-tanker part 156 lies under the tanker. The direct attachment structure then deballasts itself (by emptying water from ballast tanks) until its parts 156, 160 engage the tanker. A mooring hawser 162 that previously held the floating structure in the vicinity of a tower 164, is detached from the floating structure and attached to the tanker. The direct attachment floating structure 150 includes a regas system that warms LNG and a pump system that pumps the gas though a gas hose 166 to a swivel 170 on the tower. From the swivel, the gas flows down the tower to the sea floor as in the other embodiments of the invention. FIG. 8 shows the top of the tower 164 with a yoke 172 that has a proximal end 174 that can rotate about the tower axis 176 and that connects to the floating structure or tanker though the hawser 162.

FIGS. 9–11 illustrate another gas offloading system 178 for a shallow sea location of no more than 70 meters depth, in which a breakwater 180 is fixed to the sea floor 181 and a tanker 26 is moored alongside the breakwater. The breakwater is oriented so one side 182 lies opposite the direction 184 of prevailing winds and waves. The breakwater 180 has a length that is at least 60%, and preferable at least 100% but no more than 200% of the length of the tanker that will be moored alongside the breakwater. The breakwater projects a plurality of meters above the mean tide sea surface 186 along a majority of the breakwater length. This allows the breakwater to shield the tanker from most of the forces of winds and waves, so the tanker can be safely moored in a fixed position alongside the breakwater, that is, with the tanker extending parallel to the length of the breakwater. The figures show mooring lines 190 and bumpers 192. The breakwater preferably has an average width W that is less than 25% of its length L and actually has a width less than one-eighth its length. LNG tankers are commonly about 200 meters long and the breakwater has a length on the order of magnitude of 200 meters.

A cryogenic hose or pipe 200 transfers very cold (e.g. −160° C.) hydrocarbons from the tanker to equipment 202 placed on the top of, or on the inside of the breakwater. The equipment includes a regas unit that heats the cold gaseous (when heated) hydrocarbons, and pumps that pressurize the gas. The pressurized gas is pumped though a pipe 204 that carries it to a reservoir pipe 206 that leads to a cavern 210 (that lies under the sea or under an onshore location), and/or to a sea floor pipe 212 that carries gas past a shoreline 214 to an onshore installation 216.

FIG. 9 shows an electrical power line 220 that extends between an onshore power system 222 and the breakwater. The power line can be used to carry electrical power to the breakwater to power electrically energized regas and pumping equipment, or can be used to carry power from a power generating unit 224 on the breakwater to the onshore system when most electric power is not required at the breakwater.

Thus, the invention provides gas offloading and pressurizing systems for transferring LNG or other cold hydrocarbons whose temperature is well below 0° C., from a tanker to an onshore facility and/or a cavern, at an offshore location of shallow depth (no more than 70 meters). A system can includes a fixed tower with a mooring swivel at the top, and a floating structure such as a barge that is moored to the tower to weathervane about the tower. The floating structure is connected to the tanker so the combination of floating structure and tanker weathervanes as a combination. Regas facilities for heating cold hydrocarbons (below 0° C.) and pressurizing facilities for pumping the resulting gas, as well as any crew quarters, are located on the floating structure where they can be placed at minimum cost. This allows the use of a tower of minimum size and cost. The floating structure can be a barge that is permanently moored to a tower yoke, or a direct attachment floating structure that fixes itself to the tanker while the tanker is moored to the tower. An electric power cable can extend between the floating structure and an onshore power system. Electrical energy can be carried from the shore to the floating structure to power electrically energized equipment, or electrical energy can be carried from an electricity generator on the floating structure to an onshore electric distributing facility when such electricity is not needed on the floating structure.

Another gas offloading and pressurizing system for shallow depths, includes a breakwater to which a tanker is moored, which shields the tanker from winds and waves and which also carries regas and pressurizing equipment.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An offshore offloading system for offloading liquid LNG from a tanker that lies in a shallow sea, and passing the LNG through a regas unit to create warmed gaseous hydrocarbons and passing the warmed hydrocarbons through a gas conduit arrangement to an onshore station comprising:

- a floating structure that is coupled to said tanker to receive said liquid LNG therefrom;
- a mooring tower lying in said sea, said tower having a lower end mounted at a fixed position on the sea floor and having an upper end extending above the sea surface;
- a yoke having a proximal end that is rotatable about a primarily vertical axis on the tower upper end, and having a distal end coupled to said floating structure;
- said regas unit lies on said floating structure, and said tower is devoid of regas equipment;
- a gas storage cavern;
- said gas conduit arrangement includes a fluid swivel mounted on said tower, a first conduit part that extends from said floating structure to a rotatable part of said fluid swivel, a second conduit part that extends from said fluid swivel down to said cavern, and a third conduit part that extends from said cavern to said onshore station, whereby to store varying amounts of gaseous hydrocarbons in the cavern and flow them more evenly to the onshore station.

2. An offshore offloading system for offloading liquid LNG from a tanker that lies in a shallow sea, and passing the LNG through a regas unit to create warmed gaseous hydrocarbons and passing the warmed hydrocarbons through a gas conduit arrangement to an onshore station comprising:

- a floating structure that is coupled to said tanker to receive said liquid LNG therefrom;
- a mooring tower lying in said sea, said tower having a lower end mounted at a fixed position on the sea floor and having an upper end extending above the sea surface;
- a yoke having a proximal end that is rotatable about a primarily vertical axis on the tower upper end, and having a distal end coupled to said floating structure;
- said regas unit lies on said floating structure, and said tower is devoid of regas equipment;
- an energized injection unit that consumes power and that pressurizes said warmed gas sufficiently that the warmed gas flows through said conduit arrangement to said onshore station without pressure boosting along the way;
- said injection unit lies on said floating structure, and said tower is devoid of an energized injection unit that boosts the pressure of the warmed gas.

3. A method for transferring hydrocarbons that have been cooled for transport in a non-gaseous form, from a tanker that lies in a shallow region of a sea, to an onshore station, comprising:

mooring a floating structure to a tower having a lower end fixed to the sea floor in said shallow region, so the floating structure can move about a vertical axis extending through the tower, connecting the tanker to the floating structure, and weathervaning the combination of said floating structure and tanker about said tower;

transferring said hydrocarbons from the tanker to the floating structure, passing the hydrocarbons through a fluid swivel at the top of said tower, and passing the hydrocarbons down along said tower to the sea floor and from there to said onshore station, including heating the hydrocarbons to create warmed hydrocarbon gas and pressurizing the warmed gas;

said steps of heating the hydrocarbons and pressurizing the warmed gas occurring before the hydrocarbons reach said fluid swivel on the top of said tower;

said step of passing the hydrocarbons down along said tower to the sea floor and from there to said onshore station, includes passing hydrocarbons that have passed along the tower to the sea floor, to an underground cavern for storage therein, and then to said onshore station for distribution.

4. A method for transferring cold hydrocarbons that have been cooled for transport in a non-gaseous form, from a tanker that lies in a shallow region of a sea, to an onshore station, comprising:

mooring a floating structure to a tower having a lower end fixed to the sea floor in said shallow region, so the floating structure can move about a vertical axis extending through the tower, connecting the tanker to the floating structure, and weathervaning the combination of said floating structure and tanker about said tower;

transferring said cold hydrocarbons from the tanker to the floating structure, passing the hydrocarbons through a fluid swivel at the top of said tower, and passing the hydrocarbons down along said tower to the sea floor and from there to said onshore station, including heating the cold hydrocarbons to create warmed hydrocarbon gas and pressurizing the warmed gas;

said steps of heating the cold hydrocarbons to create warmed gas and pressurizing the warmed gas occurring on said floating structure and before the hydrocarbons reach said fluid swivel on the top of said tower, so said fluid swivel carries only warmed gaseous hydrocarbons.

5. The method described in claim 4 wherein:

said hydrocarbons that have been cooled for transport are in a liquid state, and said step of transferring said hydrocarbons from the tanker to the floating structure comprises transferring liquid hydrocarbons to said floating structure;

said steps of heating the hydrocarbons and pressurizing the warmed hydrocarbons includes converting said liquid hydrocarbons to a gaseous state on said floating structure and pressurizing the gaseous hydrocarbons on said floating structure, to pass only gaseous hydrocarbons to the fluid swivel at the top of the tower.

* * * * *